United States Patent
Su et al.

(10) Patent No.: US 9,973,942 B2
(45) Date of Patent: May 15, 2018

(54) APPARATUS AND METHODS FOR CLIENT SERVER INTERACTION IN HYBRID NETWORK ENVIRONMENTS

(75) Inventors: Li Su, Cupertino, CA (US); Jianxiong Shi, Jr., Cupertino, CA (US); Madhusudan Chaudhary, Cupertino, CA (US); Longda Xing, San Jose, CA (US)

(73) Assignee: Apple Inc., Cupertino, CA (US)

(*) Notice: Subject to any disclaimer, the term of this patent is extended or adjusted under 35 U.S.C. 154(b) by 68 days.

(21) Appl. No.: 13/475,482

(22) Filed: May 18, 2012

(65) Prior Publication Data

US 2012/0294173 A1 Nov. 22, 2012
US 2015/0271685 A9 Sep. 24, 2015

Related U.S. Application Data

(60) Provisional application No. 61/488,649, filed on May 20, 2011, provisional application No. 61/598,818, (Continued)

(51) Int. Cl.
*H04W 40/12* (2009.01)
*H04W 24/02* (2009.01)
(Continued)

(52) U.S. Cl.
CPC ........... *H04W 24/02* (2013.01); *H04W 24/10* (2013.01); *H04W 56/0005* (2013.01);
(Continued)

(58) Field of Classification Search
CPC ......... H04W 36/0022; H04W 36/0066; H04W 88/06
See application file for complete search history.

(56) References Cited

U.S. PATENT DOCUMENTS 6,937,861 B2 * 8/2005 Vanghi ............... H04W 76/025
370/315
2006/0153139 A1 7/2006 Bae et al.
(Continued)

FOREIGN PATENT DOCUMENTS

EP 0415515 3/1991
JP 2005294914 10/2005
(Continued)

OTHER PUBLICATIONS

Office Action from Japanese Application No. 2014511605, dated Nov. 7, 2014, English and Japanese versions, pp. 1-9.
(Continued)

*Primary Examiner* — Rhonda Murphy
(74) *Attorney, Agent, or Firm* — Meyertons, Hood, Kivlin, Kowert & Goetzel, P.C.

(57) ABSTRACT

Methods and apparatus for modifying network management for hybrid operation. In one embodiment, the networks include an LTE network and a CDMA 1× network, and a mobile device can place CDMA 1× voice calls while registered with the LTE network. However, since the mobile device cannot simultaneously measure information for the LTE network while connected to the CDMA 1× networks, the mobile device modifies measurements and behaviors reported to the LTE network. In one implementation, the mobile device accounts for the time switched away from the LTE network in one or more subsequent reports thereto.

20 Claims, 4 Drawing Sheets

Related U.S. Application Data filed on Feb. 14, 2012, provisional application No. 61/599,320, filed on Feb. 15, 2012.

(51) Int. Cl.

| | | |
|---|---|---|
| *H04W 24/10* | (2009.01) | |
| *H04W 88/06* | (2009.01) | |
| *H04W 56/00* | (2009.01) | |
| *H04W 76/04* | (2009.01) | |
| *H04W 48/18* | (2009.01) | |
| *H04W 48/16* | (2009.01) | |

(52) U.S. Cl.
CPC ..... *H04W 56/0045* (2013.01); *H04W 76/048* (2013.01); *H04W 88/06* (2013.01); *H04W 48/16* (2013.01); *H04W 48/18* (2013.01)

(56) References Cited

U.S. PATENT DOCUMENTS

| | | |
|---|---|---|
| 2007/0183383 A1 | 8/2007 | Bitran et al. |
| 2009/0131054 A1 | 5/2009 | Zhang |
| 2009/0279517 A1 | 11/2009 | Chin et al. |
| 2009/0280812 A1 | 11/2009 | Cheng et al. |
| 2010/0329210 A1 | 12/2010 | Shirota et al. |
| 2011/0237257 A1* | 9/2011 | Soliman et al. ............... 455/436 |
| 2012/0214494 A1* | 8/2012 | Awoniyi ............... H04W 88/10 455/439 |
| 2012/0236709 A1* | 9/2012 | Ramachandran et al. .... 370/221 |

FOREIGN PATENT DOCUMENTS

| | | |
|---|---|---|
| JP | 2006512872 | 4/2006 |
| JP | 2006333244 | 12/2006 |
| JP | 2013517743 | 5/2013 |
| KR | 10-0425077 B1 | 3/2004 |
| WO | 2004059858 A1 | 7/2004 |
| WO | 2011046477 | 4/2011 |

OTHER PUBLICATIONS

Office Action from Chinese Application No. 201210245497.4, dated Feb. 3, 2015, English and Chinese versions, pp. 1-21.
Notice of Allowance from Japanese Application No. 2014511605, dated Mar. 2, 2015, English and Japanese version, pp. 1-5.
Office Action, Korean Application No. 10-2013-7033909, dated Oct. 29, 2015, 7 pages.

\* cited by examiner

APPARATUS AND METHODS FOR CLIENT SERVER INTERACTION IN HYBRID NETWORK ENVIRONMENTS

PRIORITY AND RELATED APPLICATIONS

This application claims priority to U.S. Provisional Patent Application Ser. Nos. 61/488,649 filed May 20, 2011 entitled "APPARATUS AND METHODS FOR CLIENT SERVER INTERACTION IN HYBRID NETWORK ENVIRONMENTS", 61/598,818 filed Feb. 14, 2012 entitled "APPARATUS AND METHODS FOR CLIENT SERVER INTERACTION IN HYBRID NETWORK ENVIRONMENTS", 61/599,320 filed Feb. 15, 2012 entitled "APPARATUS AND METHODS FOR CLIENT SERVER INTERACTION IN HYBRID NETWORK ENVIRONMENTS", each of which is incorporated by reference in its entirety.

This application is related to co-owned, co-pending U.S. patent application Ser. No. 13/475,802 filed contemporaneously herewith on May 18, 2012, and entitled "APPARATUS AND METHODS FOR NETWORK ASSISTED HYBRID NETWORK OPERATION", Ser. No. 13/475,655 filed contemporaneously herewith on May 18, 2012, and entitled "APPARATUS AND METHODS FOR OPTIMIZING SCHEDULED OPERATIONS IN HYBRID NETWORK ENVIRONMENTS," and co-owned, U.S. Provisional Patent Application Ser. No. 61/478,922 filed Apr. 25, 2011, and entitled "DUAL NETWORK MOBILE DEVICE RADIO RESOURCE MANAGEMENT", Ser. No. 13/099,204 filed May 2, 2011, and entitled "SINGLE-RADIO DEVICE SUPPORTING COEXISTENCE BETWEEN MULTIPLE RADIO ACCESS TECHNOLOGIES", 61/472,617 filed Apr. 6, 2011, and entitled "MULTIPLE NETWORK MOBILE DEVICE CONNECTION MANAGEMENT", 61/433,160 filed Jan. 14, 2011, and entitled "DYNAMIC LOADING IN DEVICES WITH MULTIPLE ANTENNAS", and 61/433,162 filed Jan. 14, 2011, and entitled "MULTIMODE USER EQUIPMENT WITH DUAL CIRCUIT ARCHITECTURE", each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to operation within heterogeneous wireless systems such as, for example, hybrid network operation in which client devices can connect to any one or more of several networks. More particularly, in one exemplary aspect, the present invention is directed to methods and apparatus for modifying network management for hybrid operation.

2. Description of Related Technology

A cellular network operator provides mobile telecommunications services to the public via a network infrastructure of e.g., cellular base stations (BS), base station controllers, infrastructure nodes, etc. There is a wide variety of cellular network technologies, and historically cellular devices have been specialized for operation within a single cellular network. However, as cellular technologies have become increasingly commoditized, devices are now able to offer so-called "multimode" operation; i.e., a single device that is capable of operation on two or more cellular networks. Multimode operation allows a device to operate on any one of several network technologies, but does not enable operation on multiple network technologies simultaneously.

Incipient research is directed to so-called "hybrid" network operation. During hybrid network operation, the client device operates simultaneously among multiple distinct networks, including those having different technologies. In one exemplary case, a hybrid device can support both: (i) Long Term Evolution (LTE) and (ii) Code Division Multiple Access 1× (CDMA 1×) networks; i.e. the device can maintain a simultaneous connection between a first LTE network and a second CDMA 1× network. For example, a LTE/CDMA 1× hybrid device can conduct a voice call over the CDMA 1× network while the mobile device is in LTE mode. In another exemplary case, a hybrid device can support both: (i) CDMA 1×-EVDO (Evolution Data Optimized) and (ii) CDMA 1× networks.

Existing solutions for hybrid network operation rely on the client device to manage its own operation between networks. Specifically, the client device is responsible for maintaining its active connections to the various service networks; there are no required changes to existing network installations (i.e., hybrid network operation does not affect the legacy hardware and software of the network infrastructure). Client-centric hybrid operation has several benefits. For example, there is very little (if any) infrastructure cost for the network operator. Moreover, hardware costs can be incorporated into the price of consumer devices. Additionally, hybrid network operation will not affect existing legacy devices. Similarly, devices capable of hybrid operation are also capable of normal operation.

However, since existing solutions for hybrid network operation do not require the constituent networks to coordinate with one another, each network of the hybrid network does not have sufficient information to make optimal resource management decisions. In particular, during normal "non-hybrid" operation, a client device may, for example monitor radio link quality of the serving cell, perform neighbor cell measurements, conduct intra/inter-frequency handover between base stations, periodically enter a low power state (discontinuous reception (DRX)), etc. For reasons made more apparent subsequently herein, client device hybrid operation affects existing metrics, reporting, and behaviors, which causes incorrect network management responses.

Consequently, improved methods and apparatus are needed to modify network management for hybrid operation.

SUMMARY OF THE INVENTION

The present invention satisfies the aforementioned needs by providing, inter alia, improved apparatus and methods for modifying network management for hybrid operation.

In one aspect of the present invention, an apparatus configured to modify radio measurements during hybrid operation is disclosed. In one exemplary embodiment, the apparatus includes: one or more wireless interfaces; one or more processor elements; a switching element (such as e.g., a switch fabric), the switching element configured to connect the one or more wireless interfaces to the one or more processor elements; and a non-transitory computer-readable medium including at least one computer program. In one variant, the at least one computer program configured to, when executed by at least one of the one or more processor elements, connect at least a first processor of the one or more processor elements to a first interface of the one or more wireless interfaces, and switch the at least first processor to a second interface of the one or more wireless interfaces. The at least one program may further be configured to track one or more context information associated with the first interface while switched to the second interface, switch the at least first processor back to the first interface of the one or more wireless interfaces, and augment at least one radio measurement with the tracked one or more context information.

In another variant, the first interface comprises a data-only network.

In yet another variant, the one or more context information comprises a duration of switched operation. In one such implementation, the at least one radio measurement is adjusted based on the duration.

In one variant, the first interface comprises a Long Term Evolution (LTE) compliant radio transceiver.

In a second aspect of the present invention, a method for modifying one or more measurements based on intermittent operation is disclosed. In one embodiment, the method includes: switching away from a first network for a duration; tracking one or more context information associated with the first network for the duration; resuming operation to the first network; adjusting at least one measurement according to the one or more context information; and reporting the adjusted at least one measurement to the first network.

In one variant, the method further includes tuning to a second network during the duration.

In another such variant, the first network is a data-only network.

Moreover, in some exemplary sub-variants the switching away is based on a user-initiated voice call. Alternately, in a sub-variant, the switching away is based on a paging schedule of the second network.

In a third aspect, a method for modifying network management for hybrid operation on at least a first network and a second network is disclosed. In one embodiment, the method includes: suspending one or more first operations associated with the first network; maintaining one or more context information during the suspension; and modifying one or more network management parameters based at least in part on the maintained one or more context information.

In one variant, during the suspension of the first network, one or more second operations associated with a second network are enabled. In some sub-variants, timer expiration causes resumption of one or more first operations with the first network and termination of one or more second operations associated with the second network.

In another variant, augmenting one or more context information of the first network with at least one or more updated context information tracked during the suspension.

In a third variant, one or more context information comprises cell selection data, system information block (SIB) information, a history of radio link monitoring information, a number of discontinuous reception (DRX) attempts, etc.

In some variants, the first network is a data-only network. For example, the first network may be a Long Term Evolution (LTE) network.

In another aspect, a method for modifying network management for hybrid operation is disclosed. In one embodiment, the method comprises: suspending one or more operations with a first network; switching to a second network; tracking one or more context information associated with the first network while switched to the second network; and returning to the first network;

In one variant, the suspending is responsive to the switching event, and the method further comprises augmenting one or more measurement parameters of the first network with the tracked one or more context information.

In yet another aspect of the invention, an apparatus for modifying network management for hybrid operation is disclosed. In a first embodiment, the networks are substantially unsynchronized, and the apparatus is configured to store one or more context data associated with a first network while switched to a second network.

In a further aspect of the invention, a computer-readable storage apparatus is disclosed. In one embodiment, the apparatus includes a storage medium having at least one computer program stored thereon, the at least one program being configured to, when executed, (i) responsive to a switching event, suspend one or more operations with a first network, (ii) switch to a second network, (iii) track one or more context information associated with the first network while switched to the second network, and/or (iv) augment various measurement parameters of the first network with the tracked one or more context information.

In another aspect of the invention, a network is disclosed. In one embodiment, the network modifies network management for hybrid operation based on one or more parameters reported by a client device.

In still a further aspect of the invention, a client device capable of hybrid network operation is disclosed.

Other features and advantages of the present invention will immediately be recognized by persons of ordinary skill in the art with reference to the attached drawings and detailed description of exemplary embodiments as given below.

All Figures© Copyright 2011-2012 Apple Inc. All rights reserved.

DETAILED DESCRIPTION OF THE INVENTION

Reference is now made to the drawings, wherein like numerals refer to like parts throughout.

Overview

In one aspect, the present invention provides methods and apparatus for modifying network management for hybrid operation. Specifically, in one exemplary embodiment, the mobile device accounts for the time switched away from the LTE network in subsequent reports thereto. Moreover, the mobile device further stores to memory existing context information prior to transitioning away from a first network, to a second network. When the device returns to the first network, the device can resume operation.

Existing solutions transition a device to other networks in "handover"; once transitioned, the device is no longer connected to the network. In contrast, the present invention provides methods and apparatus enabling the device to maintain multiple active device accounts by selectively ignoring network commands. However, disclosed modifications to reporting events prevent the networks from issuing corrective actions for non-responsive behavior.

Detailed Description of Exemplary Embodiments

Exemplary embodiments and aspects of the present invention are now described in detail. While these embodiments and aspects are primarily discussed in the context of Long Term Evolution (LTE), Code Division Multiple Access 1× (CDMA 1×) cellular networks, and CDMA 1×EVDO (Evolution Data Optimized), it will be recognized by those of ordinary skill that the present invention is not so limited and can be used with other cellular technologies such as TD-LTE (Time-Division Long-Term Evolution), TD-LTE-Advanced, TD-SCDMA (Time Division Synchronous Code Division Multiple Access), and Global System for Mobile Communications (GSM). In fact, the various aspects of the invention are useful in combination with any network(s) (cellular, wireless, wireline, or otherwise) that can benefit from modifications to network management for hybrid operation, the application to which is readily within the skill of the ordinary artisan given this disclosure.

Exemplary LTE/CDMA 1× Hybrid Network Operation—

Figure 1:
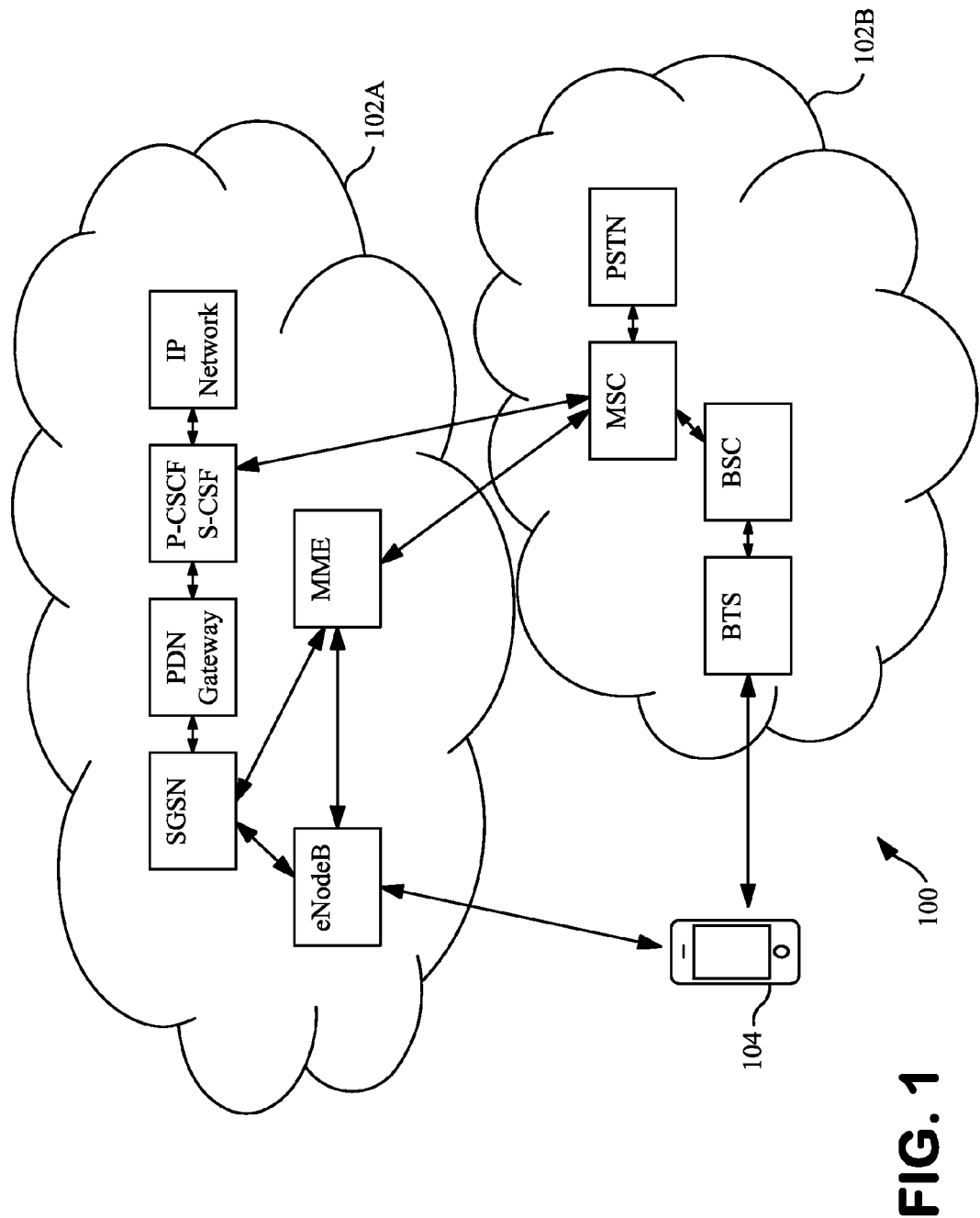
FIG. 1 is a logical block diagram illustrating one exemplary hybrid network system useful in conjunction with the present invention.

FIG. 1 illustrates an exemplary hybrid network system 100. The exemplary hybrid network comprises a first LTE RAN (radio access network) 102A and a second CDMA 1×RAN 102B in communication with a user equipment (UE) client device 104. As shown in FIG. 1, the LTE RAN and CDMA 1×RAN are unsynchronized, and entirely unaware of the other RAN's operation. In other scenarios, the RANs may have higher levels of coordination; e.g., the RANs may be loosely synchronized, or even tightly synchronized in certain aspects of their operation.

During LTE/CDMA 1× hybrid mode operation, the UE 104 can place CDMA 1× voice calls while registered with the LTE network. The UE is capable of receiving and responding to data and control messaging from either the LTE network or the CDMA 1× network; unfortunately, the UE in this scenario cannot respond simultaneously to both networks. In one such embodiment, the UE always prioritizes CDMA 1× (voice call) traffic over LTE (data) traffic to ensure that user experience for voice calls is unaffected. Other implementations may have other prioritization schemes (e.g., where voice calls are lower priority, based on the type of traffic, historic device usage, etc.)

Within this context, many operations can be greatly affected by the UE switching. The following discussions briefly describe several representative problems within an exemplary LTE/CDMA 1× network with hybrid mode operation.

Cell Selection/Re-Selection—

When a UE attempts to connect to a cellular network, the UE must search for the optimal cellular network cell for service; this is generally referred to as "cell selection". During cellular service, the UE additionally continues to monitor available cellular networks; should better reception arise, the UE can transition cells. This is generally referred to as "cell re-selection".

During cell selection/re-selection, the UE performs frequency scans, synchronization to the cell (executing e.g., primary synchronization sequence (PSS), secondary synchronization sequence (SSS), etc.), and decoding various control information (e.g., decoding a physical broadcast channel (PBCH), and decoding one or more system information blocks (SIB)).

Unfortunately, in hybrid network operation, the cell selection procedure can be interrupted while the UE tunes away to the higher priority (e.g., CDMA 1×) network. This can result in corrupted or incomplete control data. Corrupted data for cell selection/re-selection can result in the UE software temporarily barring the LTE network from use.

Similarly, in cell re-selection, the UE must periodically re-evaluate its neighboring cells. However, during the evaluation procedure, the UE may be tuned away to the CDMA 1× network which can result in improper results. In some cases, the UE may not recognize otherwise reliable networks for use.

System Information Block (SIB) Acquisition—

As previously described, during inter alia cell selection, the UE must decode system information blocks (SIBs) to determine appropriate network parameters. In LTE networks, there are a number of different SIB types, but primarily, every UE must minimally decode SIB1, and SIB2. SIB1 and SIB2 carry information such as, but not limited to: Public Land Mobile Network (PLMN) identification, timing advance (TA) information, physical cell identification, scheduling information, and channel information. Due to the importance of SIB information, the UE will bar inappropriate networks from use.

Unfortunately, in hybrid network operation, the UE may be interrupted in the middle of SIB acquisition. This can corrupt or render useless existing SIB information. Worse still, this can also result in the UE barring the LTE network from use.

Random Access Procedure—

Random access procedures are executed whenever the UE needs to initiate communications with the base station, such as to initially acquire a RRC connection. As used herein, the UE is "connected" when the UE has successfully established a Radio Resource Connection (RRC).

Random access procedures are used by UEs that have not been scheduled resources for communication with a base station. Accordingly, there is some likelihood that random access attempts may collide with other random access attempts (from other devices). Consequently, random access attempts must be acknowledged by the base station, and responded by the UE. This complex interaction requires the UE to honor network transactions in a timely manner; failure to do so will result in the UE restarting the procedure. Ideally, the UE should avoid being interrupted mid-process.

Moreover, during connected operation, the UE performs a wide variety of tasks including, but not limited to: (i) monitoring the radio link quality of the serving cell, (ii) performing neighbor cell measurement and report, (iii) conducting intra/inter-freq handover between LTE NodeBs, (iv) performing inter-RAT (radio access technology) re-direction between eHRPD (evolved high rate packet data) and LTE (long term evolution), and also executing discontinuous reception (DRX) to reduce power consumption. Various aspects of connected mode operation are described in greater detail herein.

Radio Link Monitoring—

During connected operation, the downlink radio link quality of the serving cell is monitored by the UE. The UE protocol software determines if the downlink radio link quality exceeds a minimum threshold (in-sync), or does not exceed the minimum threshold (out-of-sync). Consecutive out-of-sync radio link performance indicates that the existing RRC connection has failed and must be re-established. During typical operation (when not in discontinuous reception (DRX) operation), the UE evaluates the radio link quality in every radio frame. In DRX operation, the UE may evaluate only a subset of the radio frames.

Unfortunately, during hybrid network operation, the RF front-end will intermittently be switched to CDMA 1× while still connected to the LTE network. Since the radio link quality effectively drops out during tune out periods, existing UEs will falsely trigger radio link failure countermeasures. The UE LTE baseband will release its current RRC connection (which is still valid), and attempt to re-establish a new RRC connection to the LTE network.

Connected Mode Discontinuous Reception (DRX)—

DRX is a commonly implemented method for reducing power consumption within the UE. In DRX operation, the UE and network agree on specific time intervals where data transfer can be initiated; the UE only needs to power on at these specific time intervals. Thus, when the device does not have an active data transfer, and is between time intervals, the device can turn its receiver off and "sleep" in a low power state.

In LTE networks, DRX operation is further split into short and long cycles. A UE starts DRX operation in so-called "short cycle" DRX (where the UE checks for data in sub-frames: 2, 5, 8, 10, 16, 20, 32, 40, 64, 80, 128, 160, 256, 320, 512, 640), if no activity is received in a so-called "active time" period for the UE, then the device changes to a long cycle DRX (where the UE checks for data in sub-frames: 10, 20, 32, 40, 64, 80, 128, 160, 256, 320, 512, 640, 1024, 1280, 2048, 2560). Long cycle DRX is substantially better for power consumption, but also much less responsive than short cycle DRX.

Within the context of hybrid network operation, the transitions for DRX operation can be particularly problematic. During hybrid operation, the UE may be required to tune away from the network while in short cycle DRX mode. If the network attempts to contact the UE while the UE is tuned away during short cycle DRX mode, the UE will miss the contact attempts and may incorrectly transition to long cycle DRX, which will lead to additional data loss. In yet other cases, the network may transmit a DRX command while the UE is tuned away from the LTE network. Consequently, when the UE returns to the LTE network, the UE may be unnecessarily powering its receiver (the network treats the UE as if it were operating in DRX mode).

Cell Measurement—

Periodically, during connected mode operation, the LTE network may require the UE to measure and report information based on a specified configuration (e.g., that is provided by the LTE network). Such measurements include, but are not limited to: (i) intra-frequency cell measurement, (ii) inter-frequency cell measurement, and (iii) inter-RAT measurements of CDMA 1×EVDO and/or CDMA 1× frequencies, etc. However, during hybrid network operation, the UE may miss the network's configuration indications, or in some cases, falsely trigger measurement report events.

In some cases, cell measurement and reporting is used by the network (and the UE) to direct and/or initiate cell handover (i.e., the UE moving to another cell of the network). Inaccurate cell measurement information can cause handover failures (e.g., dropped calls, poor reception, inefficient handover, etc.) For example, the LTE network may direct the UE to handover based at least in part on various measurement reports. Faulty measurement reports may prompt the LTE network to direct the UE to handover to a different intra cell or inter cell, or in some cases, re-direct the UE to an eHRPD (evolved high rate packet data) cell. Furthermore, if this happens while the UE is tuned away to the CDMA 1× network, the handover/re-direction procedure will fail, and the network will drop the RRC connection. When the UE tunes back to the LTE network, it will have the stale RRC connection, and will need to re-establish an RRC connection, which consumes both time and other resources (e.g., power and processing).

Uplink/Downlink Resource Allocations—

LTE networks allocate resources based on the measured quality of the uplink and downlink radio channel. During normal operation, a UE that has relatively good quality is allocated more resources. Unfortunately, if a UE reports a high quality uplink and/or downlink and is subsequently tuned away, then the resources allocated for that device are wasted.

For example, in LTE networks, the UE reports CQI (Channel Quality Indicator), PMI (Precoding Matrix Index) and RI (Rank Indicator) via the physical uplink shared channel (PUSCH). These reports are used by the LTE network to determine subsequent data transmission payloads (for example, the LTE network may use previously received CQI/PMI/RI reports to determine the next sub-frame's downlink resource assignment). Unfortunately, hybrid mode UEs that are tuned away to respond to the CDMA 1× network cannot use any assigned resources.

Similarly, LTE networks also consider factors other than the radio channel. For example, each UE periodically reports its uplink buffer status and power headroom as Medium Access Control (MAC) elements to the network. The LTE network uses these inputs to assign uplink resource grants. If the UE reports favorable statuses (e.g., buffer availability, and excess headroom) the network may assign large uplink grants to the UE; these large uplink grants are wasted if the UE is tuned away.

Uplink Transmit Power—

During normal network operation, the LTE network adjusts the UE's transmit power with a transmit power control (TPC) command. The TPC is transmitted on the downlink physical dedicated control channel (DL PDCCH) in every sub-frame. Typically, LTE network infrastructures assume that uplink transmissions cannot be decoded due to interference. Consequently, existing solutions for TPC are configured to automatically increase transmit power when the network is unable to decode uplink transmissions.

In hybrid network operation, the UE will tune away to check another network. During these times, the network will mistakenly transmit TPC commands to adjust for low signaling levels by directing the UE to increase transmit power (since the UE is tuned away, these commands are not received). However, once the UE tunes back to the network, the UE will receive TPC commands that greatly increase the uplink transmit power.

Time Alignment—

As a brief aside, radio transmissions propagate at the speed of light; consequently, as the UE moves closer or farther away from the base station, the signal must be advanced or delayed to compensate for propagation delay. In LTE, this propagation compensation is referred to as "timing advance". Timing advance (TA) is assigned by a Timing Advance Command Medium Access Control (MAC) control element received from the network.

The UE also has a configurable time alignment timer (timeAlignmentTimer) which determines how long the UE will assume that it is "time aligned". When the time alignment timer expires (e.g., subframe 500, 750, 1280, 1920, 2560, 5120, 10240, infinity), the UE clears its existing uplink and downlink data, and refreshes its TA value. For example, the UE flushes its Hybrid Automatic Repeat Request (HARQ) buffers, releases its physical uplink control channel and sounding reference signals (PUCCH/SRS), and clears any configured downlink assignment and uplink grants. The time alignment timer ensures that even if the UE misses a network TA command, the UE will eventually force a TA refresh.

In hybrid network operation, the UE may miss TA commands from the network while tuned away. Moreover, the time alignment timer is suspended while the UE is tuned away from the LTE network. Thereafter, subsequent uplink data transmitted after the UE is tuned back but before the resumed time alignment timer expires will be lost.

Moreover, in unsynchronized hybrid networks (where there is no synchronization between the LTE system time and the CDMA 1× system time), switching from one network to the other network may affect time synchronization; for example, the UE may drift away from the LTE network time reference while tuned away to the CDMA 1× network. When the UE tunes back to the LTE network, the UE may have drifted far enough to lose serving cell timing (time and frequency). This can cause continuous decoding errors and/or loss in reception/transmission quality.

In addition to the foregoing, there are a plethora of other transactions and miscellaneous operations which must be modified for hybrid network operation. Still other networks and future improvements to existing network technologies will additionally create other problems for hybrid network operation.

More generally, existing cellular network technology has been designed around the assumption that the UE will not intentionally drop reception. Accordingly, cellular networks respond to message loss and/or state loss as if the UE had momentarily dropped service. However, in hybrid network operation, the UE intentionally tunes away from the network to check one or more other networks. Client and network management must be modified to handle the intentionally intermittent outages during hybrid network operation so that user experience or other important performance attributes are not adversely affected.

TD-LTE/TD-SCDMA Network Operation—

As is understood in the art, Time-Division Long-Term Evolution (TD-LTE) also known as Long-Term Evolution Time-Division Duplex (LTE TDD) is similar to Frequency Division (FD)-LTE. In the case of Frequency Division Duplex, the downlink and uplink are transmitted using different frequencies. In Time Division Duplex, the downlink and the uplink are on the same frequency and the separation occurs in the time domain, so that each direction in a call is assigned to specific timeslots. Both TD-LTE and FD-LTE allow for DRX. Similarly, Time Division Synchronous Code Division Multiple Access (TD-SCDMA) allows traffic to be uplinked (from the mobile terminal to the base station) and downlinked (from the base station to the mobile terminal) using different time slots in the same frame. Embodiments of the present invention contemplate the use of these technologies together and separately (in combination with other technologies) in a hybrid network such as by implementing the methodology described herein with respect to FIG. 2.

In an exemplary embodiment relating to both TD-LTE and TD-SCDMA, a UE connected to the TD-LTE network will periodically (or on an event driven or other basis) tune its radio away from the TD-LTE network to perform TD-SCDMA actions such as cell selection, registration, and receiving pages.

TD-LTE/GSM Network Operation—

As is understood in the art, Global System for Mobile Communications (GSM) is a cellular technology standard and has evolved a number of advancements including General Packet Radio Service (GPRS), Enhanced Data rates for GSM Evolution (EDGE), and Universal Mobile Telecommunications System (UMTS) also known as 3G (Third Generation) UMTS.

In an exemplary embodiment relating to both TD-LTE and GSM, a UE connected to the TD-LTE network will periodically (or on an event driven or other basis) tune its radio away from the TD-LTE network to perform GSM actions such as cell selection, registration, and receiving pages.

Methods—

Figure 2:
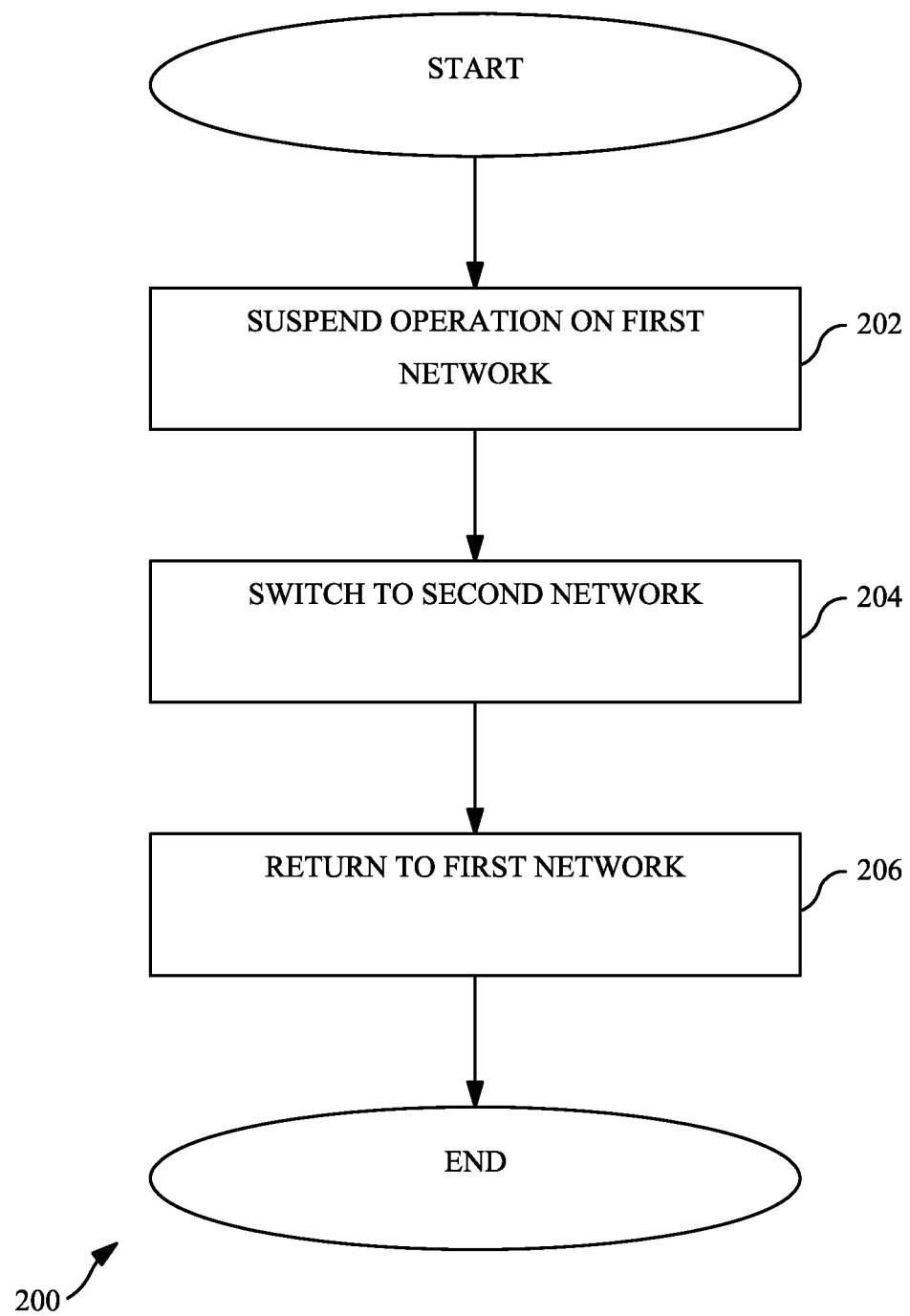
FIG. 2 is a logical flow diagram detailing one embodiment of a generalized method for modifying network management for hybrid operation, in accordance with the present invention.

Referring now to FIG. 2, one embodiment of a generalized method 200 for modifying network management for hybrid operation is illustrated. In one scenario, a client device is connected to a first network, and the first network is entirely unaware of the client device's connections to the one or more other networks. Alternatively, the first network may have limited information on nearby networks (e.g., timing information, registered devices, etc.) which may be periodically refreshed, but is not integrated within the operational decisions for the first network. Still other network scenarios may tightly integrate the first network and the one or more other networks, but still require intelligent network management. For example, even where a first LTE network is tightly coupled to a second CDMA 1× network, the LTE network may intelligently handle events where the device accesses the CDMA 1× network, and vice versa.

It will be appreciated that while the methodologies described herein are discussed primarily in the context of a switch from a first network (e.g., LTE) to a second network (e.g., CDMA 1×), and then back to the first network, the roles may readily be reversed. For example, the switch could occur from the CDMA 1× network to the LTE network, and then back again. Moreover, the present invention contemplates "hops" or permuted switching orders; e.g.: (i) from a first network to a second network, then from the second network to a third network, and then back to the first; and/or (ii) a switch from the first network to the second network, then back to the first, then from the first to the third, and back to the first, and so forth.

It will also be appreciated that similar methodologies described herein can be used in TD-LTE (Time-Division Long-Term Evolution), TD-LTE-Advanced, and TD-SCDMA (Time Division Synchronous Code Division Multiple Access), Global System for Mobile Communications (GSM).

At step 202 of the method 200, responsive to a switching event, the client device initiates suspension of operation with the first network. In one embodiment, the switching event is a predictable event. For example, as described in U.S. patent application Ser. No. 13/475,802 filed contemporaneously herewith on May 18, 2012, and entitled "APPARATUS AND METHODS FOR NETWORK ASSISTED HYBRID NETWORK OPERATION", previously incorporated by reference in its entirety, a client device is in one embodiment aware of a periodic time interval during which it must transition from an LTE network to a CDMA 1× network to check a paging schedule. In such embodiments, the client device can predictively schedule ahead of time a suspension event for all ongoing software processes.

Alternately, certain switching events are unpredictable or less predictable. For example, user usage is unpredictable; e.g., it is unknown when a user will attempt to place a voice call, initiate data transmission, etc. Various other switching events may include for example, automated events, triggered events, etc. Those of ordinary skill in the related arts will recognize that while predictable events can be handled efficiently with appropriate scheduling, unpredictable events may require abrupt measures, including event cancellation/abortion, etc., as described hereinafter.

In one embodiment, the client device notifies the network of a suspension event. Certain networks accept cancellations for an ongoing event or process. For example, cell selection procedures can be halted and intermediate results stored to a memory for storage. Other procedures may not be resumed from intermediate results, and should be aborted outright. In yet other alternate embodiments, the client device may notify the network of a poor reception event. Such processes are not configured for suspension, but the network can accept lossy behavior. For instance, certain channel measurements cannot be suspended, but the network will interpret non-reporting as an unusable channel.

In one such variant, the client device generates a bogus or fake service report for the network. For example, rather than reporting actual metrics (which may be used by the network to allocate resources), the device can report a bogus or artificially low metric. For networks that allocate resources based on reported metrics, bogus service reports ensure that few (if any) resources will be allocated to the device during the tuned away period.

At step 204, the client device switches to at least one other network. In one embodiment, during switched operation the client device is unable to receive and/or transmit data to the first network. Moreover, in some variations, during switched operation, the first network is unaware that the client is no longer responsive. It should be of particular note that the aforementioned step of suspension does not in the illustrated embodiment disconnect the client device from the first network; instead, software processes are merely halted. Both the first network and the client device may maintain context information to resume operation. It is appreciated, however, that other mechanisms may be used in place of or in conjunction with the aforementioned "software halt" in order to "suspend" operation within the first network consistent with the broader method.

Moreover, in some embodiments, the client device and/or network continue to track and/or update context information. For example, in some embodiments, the device continues to increment timers associated with the first network (and vice versa). Such measurements of time may be particularly useful when determining subsequent adjustment to reported parameters, as described in greater detail hereinafter. In one exemplary implementation, the device maintains a switch timer which is used to determine the amount of time spent in the switched network.

At step 206, the client device returns to the first network and resumes operation with the first network. During resumption, the client device resumes its logical connection to the first network, including waking suspended internal software processes. For example, a mobile device resuming a LTE software stack will execute "wake-up" procedures that are similar to idle mode discontinuous reception (DRX) wake up.

Figure 2A:
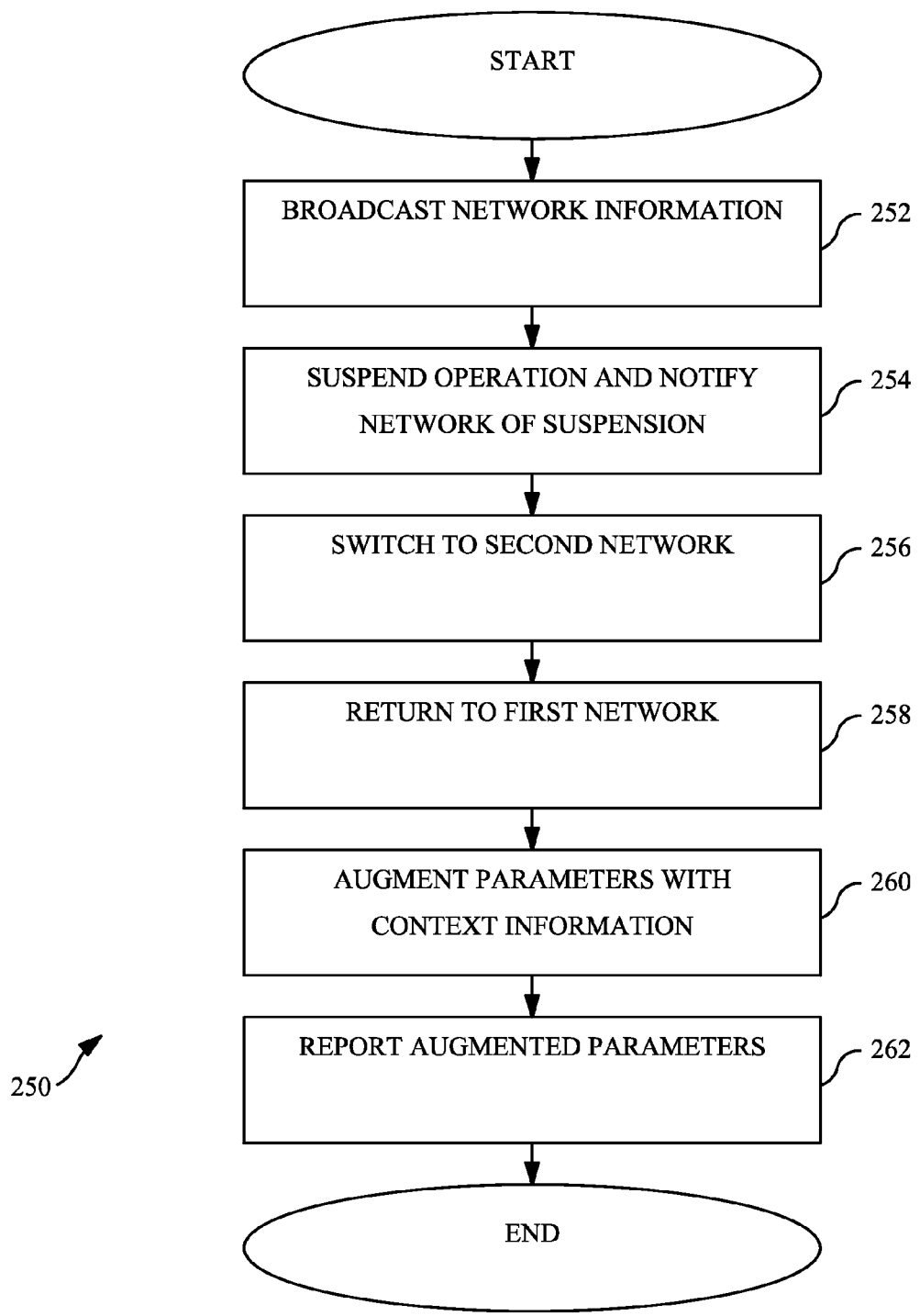
FIG. 2a is a logical flow diagram detailing one specific implementation of the method of FIG. 2.

Referring now to FIG. 2a, one particular implementation of the method 200 of FIG. 2 for modifying network management for hybrid operation is illustrated.

At step 252 of the method 250, the first network (e.g., LTE network) broadcasts information pertaining to at least one other network. In at least one exemplary embodiment, the first network broadcasts a time reference to assist in the client device hybrid operation with a second network. Since the client device must normally acquire system time of the second network prior to any data transfer, providing the system time of the second network to the client device before transition greatly improves transition efficiency.

For example, an LTE network may broadcast a System Information Block (SIB) that contains system time information for a CDMA 1× network. Since both LTE and CDMA 1× time bases are derived from the Global Positioning System (GPS) time reference, the time references may differ, but will not substantively drift from one another over time. In one embodiment, the LTE network derives the appropriate CDMA 1× network time, and broadcasts the derived time within a SIB. Any mobile device can decode the SIB while on the LTE network to determine its appropriate assigned paging indicator on the CDMA 1× Quick Paging Channel (QPCH) (and corresponding paging slot).

Other types of information broadcast by a first network to assist a client device during transition to a second network include, but are not limited to: system time information, search window sizes, cell reselection parameters, and cell registration parameters. Moreover, existing information that is already broadcasted for inter-RAT (radio access technology) handovers can readily be used for hybrid network operation as well. For example, existing LTE deployments broadcast SIBS, which contains information relevant for CDMA2000 inter-RAT operation (information about CDMA2000 frequencies and CDMA2000 neighboring cells relevant for cell re-selection).

At step 254 of the method 250, responsive to a switching event, the client device initiates suspension of operation with the first network as previously described. During suspension of operation, the client device in this embodiment maintains a logical connection to the first network, however internal software processes directed to network operation with the first network are halted. For example, a mobile device executing a LTE software stack can execute suspend/abort procedures similar to idle mode discontinuous reception (DRX). Various examples of suspension of activities are described in greater detail hereinafter (see Example Operation).

In one embodiment, the switching event is a predictable event as previously discussed. Alternately, certain switching events are unpredictable or less predictable. In this embodiment, the client device also notifies the network of a suspension event.

At step 256, the client device switches to at least one other network (e.g., a CDMA 1× network).

At step 258, the client device returns to the first (LTE) network, and resumes operation with the first network. During resumption, the client device resumes its logical connection to the first network, including waking suspended internal software processes.

At step 260, the client device augments various measurement parameters with context information of step 256. For example, in some embodiments reporting metrics are adjusted for the amount of time spent in the switched network. In alternate embodiments, reporting metrics are corrected according to the last true value (e.g., prior to the switch event). In yet other embodiments, reporting metrics are reset.

At step 262, the client device additionally further reports the augmented metrics back to the first network.

Example Operation—

Exemplary embodiments of the present invention are now described with respect to the exemplary hybrid network operation within the LTE/CDMA 1x network of FIG. 1. During hybrid operation, the UE 104 is registered to the LTE network 102A and the CDMA 1x network 102B. Each time the UE tunes away from the LTE network to the CDMA 1x network, the UE suspends existing operation. Once the UE returns to the LTE network, suspended operations are resumed. Implementation specific operations are described in greater detail hereinafter.

Cell Selection/Re-Selection—

As previously described, when the UE tunes away to a higher priority CDMA 1x network, existing cell selection/re-selection procedures can be corrupted. Corrupted data for cell selection/re-selection can result in the UE software temporarily barring the LTE network from use.

Accordingly, in one exemplary embodiment of the invention, cell selection and re-selection data is stored during suspension. The UE stores existing cell selection data which may include, but is not limited to: (i) frequency bands scanned, (ii) primary synchronization signals (PSS) scanned, (iii) secondary synchronization signals (SSS) scanned, and (iv) acquired system information blocks (SIB). Cell re-selection data may include, but is not limited to: (i) neighbor cell measurements, (ii) neighbor cell ranking, and (iii) cell re-selection timer values.

Once the UE returns from the other network, the stored data is retrieved, and the UE can resume cell selection/cell re-selection procedures.

In alternate embodiments, cell selection and re-selection data is flushed during suspension, once the UE returns from the other network, the cell selection/re-selection procedures must be restarted.

System Information Block (SIB) Acquisition—

Similarly, the UE may be interrupted in the middle of SIB acquisition when tuning away from the LTE network, which can result in the UE barring the LTE network from use.

Accordingly, if the UE is interrupted during SIB acquisition, the current status of SIB acquisition is in one embodiment of the invention saved before the UE tunes away. Such information may include for example: (i) received SIBs, (ii) SIB update periods, and (iii) SIB value tags.

Once the UE returns from the other network, the UE checks to determine if the SIB update period has passed, and if the value tag is changed. If so, then the UE's SIB data is out of date and must be refreshed (e.g., the UE must restart SIB acquisition). If not, then the UE can continue operation with existing SIB data.

Random Access Procedure—

Random access procedures are executed whenever the UE needs to initiate communications with the base station. In fact, random access procedures are not scheduled. If the UE is interrupted in the middle of a random access procedure, the UE can simply abort the random access.

Alternately, since random access are not scheduled (and can be arbitrarily performed), context information regarding the random access attempt can be postponed, and resumed after the UE has tuned back.

Radio Link Monitoring—

Prior art UEs monitor the downlink radio link quality of the serving cell. Since the radio link quality is effectively non-existent during tune out periods, the prior art LTE baseband will interpret these reports incorrectly, resulting in "false alarm" radio link failure countermeasures.

However, in one exemplary embodiment of the present invention, the LTE baseband ignores radio quality evaluations during "tune out" periods. Instead, the LTE baseband stores the current history of radio link monitoring prior to tuning away. Once the LTE baseband tunes back, the radio link monitoring is resumed. The radio link is not evaluated during the tuned out time interval. In some cases, the measurements may be corrected (e.g., based on a time averaged value, etc.).

Connected Mode Discontinuous Reception (DRX)—

Referring back to prior art solutions, the UE may be required to tune away from the network while in short cycle DRX mode. If the network attempts to contact the UE while the UE is tuned away during short cycle DRX mode, the UE will miss the contact attempts and may incorrectly transition to long cycle DRX, which will lead to additional data loss.

Consequently, in one exemplary embodiment of the present invention, prior to the UE tuning away from the LTE network, the UE stores the current number of short cycle DRX attempts. When the UE tunes back to the LTE network, the UP does not consider the missed cycles toward (or against) the required count of cycles necessary to transition to long cycle DRX. Instead, the UE continues from the stored number of short cycle DRX attempts. Specifically, only the short cycle DRX attempts actually checked by the UE are used to determine when the UE can transition to long cycle DRX.

Cell Measurement—

As previously described, the LTE network may require the UE to measure and report information based on a specified configuration (e.g., that is provided by the LTE network). Since hybrid network operation may cause the UE to miss the network's configuration indications, or falsely trigger measurement report events, in one exemplary embodiment of the present invention, the UE will flush existing configurations and cell measurements when suspended. Once the exemplary UE tunes back to the LTE network, the UE generates measurement reports anew to ensure that handovers can be properly triggered.

Uplink/Downlink Resource Allocations—

As previously described. LTE networks allocate resources based on the measured quality of the uplink and downlink radio channel. Prior art UEs may report high quality uplink and/or downlink radio channels, which would cause the network to assign the UE a significant chunk of network resources. If subsequently thereafter the UE is tuned away, these assigned resources would be wasted.

Therefore, in one embodiment of the present invention, before tuning away to the CDMA 1x network, the UE reports bogus reception quality values (e.g., minimum. CQI/PMI/RI) to the network so as to minimize the possibility of the LTE network assigning large downlink radio resources to the UE while UE is tuned to the CDMA 1x network. Similarly, the UE can also report bogus transmission capabilities (e.g. zero uplink buffer status and power headroom) so the network does not grant the UE significant transmit resources while the UE is tuned away.

Uplink Transmit Power—

Existing solutions for TPC are configured to automatically increase transmit power when the network is unable to decode uplink transmissions. Since the network will mistakenly transmit TPC commands to adjust for low signaling levels while the UE is tuned away, once the UE tunes back to the network, the UE will receive TPC commands that greatly increase the uplink transmit power.

Accordingly, in one exemplary embodiment of the present invention, prior to tuning away, the UE stores its current transmit power. Once the UE tunes back, the UE's transmit power is resumed from the stored transmit power. Thereafter, network power adjustments are compensated accordingly with an offset (the offset equal to the difference between the base station's indicated power and the stored transmit power). In some alternate variants, the UE may additionally try reduce the offset. For example, the UE may transmit at slightly higher power levels than the base station is adjusting for if the UE transmits at a first power level, and the base station directs the UE to attenuate by XdB, the UE can attenuate by YdB (slightly less attenuation than XdB). The base station will continue to command the UE to attenuate its signal, over several iterations, the offset will eventually return to zero.

Time Alignment—

Referring back to prior art embodiments, existing UEs that miss timing advance (TA) commands from the network while tuned away will lose synchronization, etc.

Accordingly, in one exemplary embodiment of the present invention, the UE time alignment timer (timeAlignmentTimer) is kept running even while the UE is tuned away. Once the UE is tuned back, it checks the time alignment timer. If the TA timer has expired, then the UE uplink data transfer is restarted with random access procedures (i.e. such that the UE receives a new TA value).

Apparatus—

Figure 3:
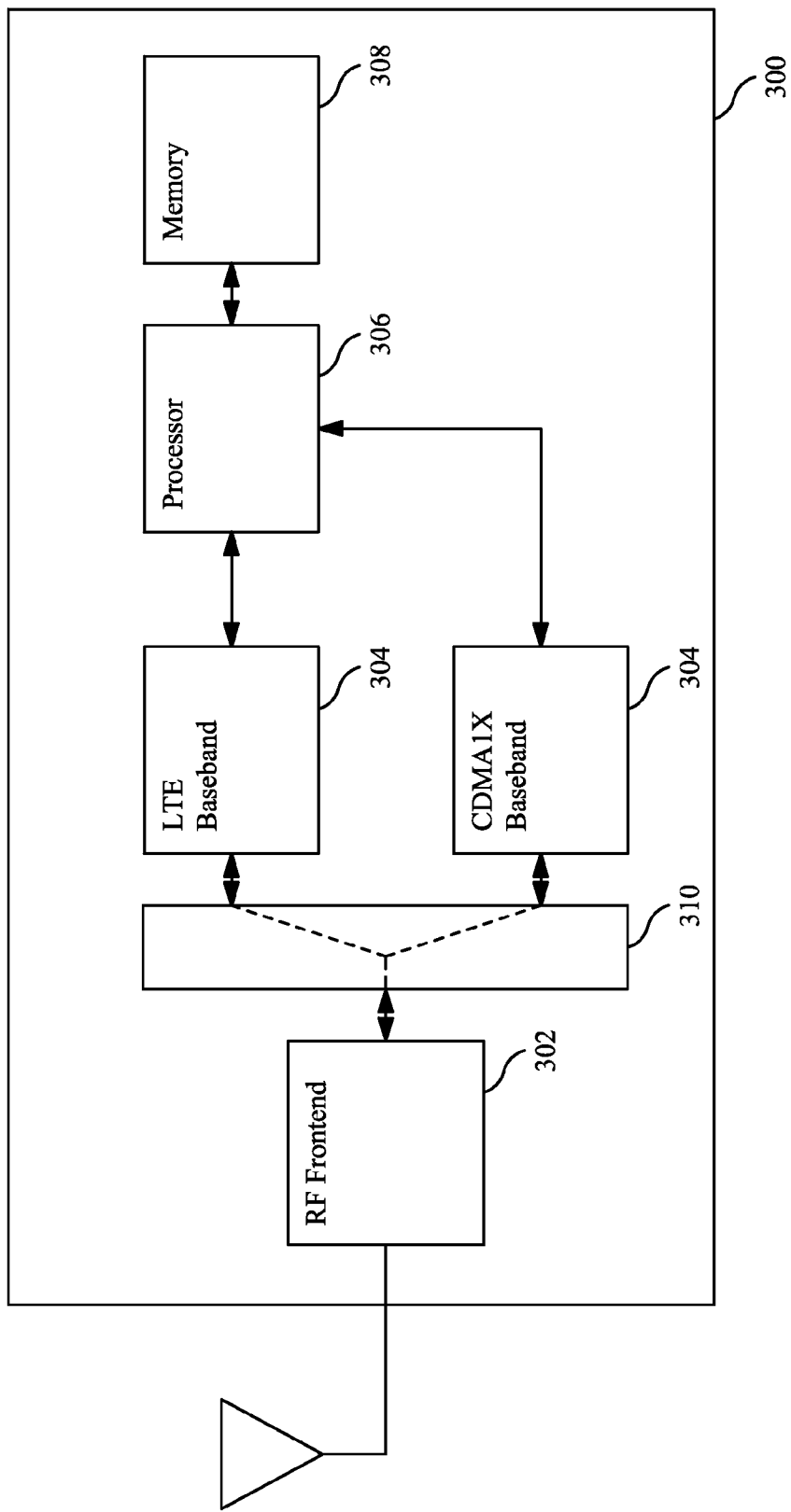
FIG. 3 is a functional block diagram of an exemplary embodiment of a user equipment (UE) apparatus configured according to the present invention.

Referring now to FIG. 3, the exemplary user equipment (UE) apparatus 300 is illustrated in greater detail. The UE includes: (i) one or more Radio Frequency (RF) front-ends 302, (ii) one or more baseband processors 304, and (iii) at least one application processor 306 and associated memor(ies) 308. In various implementations, the RF front-ends and baseband processors may be further specialized to handle a single wireless technology, or generalized to encompass multiple wireless technologies.

As shown, the exemplary UE includes a first RF front-end that is coupled to both first and second baseband processors adapted to interface to a LTE network and CDMA 1× network, respectively. It is further appreciated that the foregoing configuration is purely illustrative, and various implementations may include other cellular technologies such as GSM, GPRS, EDGE, WCDMA, CDMA2000, CDMA 1×EVDO, LTE-A (LTE Advanced), etc. in various combinations. Moreover, while only a single RF front-end is shown for simplicity, it is appreciated that a RF front-end can (and generally will) include multiple receive and/or transmit antennas and/or chains. For example, well known MIMO (Multiple In Multiple Out), SISO (Single In Single Out), MISO (Multiple In Single Out), and SIMO (Single In Multiple Out) antenna configurations are widely used within the related arts, and may be used consistent with the present invention.

Additionally, in one exemplary embodiment, the UE 300 further comprises a switching fabric 310 that can connect any one (or more) of the baseband processors 304 to various one (or more) of the antennas 302. The illustrated switching fabric is adapted to connect either the LTE baseband or CDMA 1× baseband to the RF front-end. However, common embodiments may connect one baseband processor to one antenna ("one-to-one"), one-to-many, many-to-one, etc. This "switching" capability is desirable for a number of reasons, including for example: (i) power management, (ii) processing efficiency/flexibility, and (iii) antenna isolation constraints may require that only a subset of radios of a mobile device are active at any one time. In some small form factor designs, there is not enough space to completely isolate multiple antennas during operation; consequently, only one antenna can be active at any time. Similarly, certain form factor designs may reuse antennas for different wireless interfaces, such that only one wireless interface can use a common antenna at any given time. Yet other motivations will be appreciated by those of ordinary skill in the related arts, and are not discussed further herein (e.g., business or profit considerations, network utilization, etc.)

Moreover, it will be appreciated that other components are commonly incorporated within UE 300, but are not discussed further herein. For example, the UE may include user interface components (display screens, buttons, touch screens, dials, etc.), memory components (e.g., RAM (Random Access Memory), Flash, hard disk drives (HDD), etc.), power management components (e.g., batteries, charger components, etc.), and external interfaces (e.g., FireWire™, Universal Serial Bus™ (USB), Thunderbolt, etc.)

Furthermore, it should be recognized that the UE depicted in FIG. 3 is merely illustrative of one exemplary embodiment. Still other variants useful with the present invention are described with greater detail in co-owned and U.S. Provisional Patent Application Ser. No. 61/478,922 filed Apr. 25, 2011, and entitled "DUAL NETWORK MOBILE DEVICE RADIO RESOURCE MANAGEMENT", Ser. No. 13/099,204 filed May 2, 2011, and entitled "SINGLE-RADIO DEVICE SUPPORTING COEXISTENCE BETWEEN MULTIPLE RADIO ACCESS TECHNOLOGIES", 61/472,617 filed Apr. 6, 2011, and entitled "MULTIPLE NETWORK MOBILE DEVICE CONNECTION MANAGEMENT", 61/433,160 filed Jan. 14, 2011, and entitled "DYNAMIC LOADING IN DEVICES WITH MULTIPLE ANTENNAS", and 61/433,162 filed Jan. 14, 2011, and entitled "MULTIMODE USER EQUIPMENT WITH DUAL CIRCUIT ARCHITECTURE", each of the foregoing being incorporated herein by reference in its entirety.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. An apparatus configured to modify radio measurements during hybrid operation, comprising:
one or more wireless interfaces;
one or more processor elements;
a switching element, the switching element configured to connect the one or more wireless interfaces to the one or more processor elements; and
a non-transitory computer-readable medium comprising at least one computer program, the at least one computer program configured to, when executed by at least one of the one or more processor elements:
    connect at least a first processor of the one or more processor elements to a first interface of the one or more wireless interfaces;
    provide to the first interface at least one of incorrect transmission capability or incorrect reception quality parameters selected to discourage assignment of network resources to the apparatus;
    switch the at least first processor to a second interface of the one or more wireless interfaces after providing the at least one of incorrect transmission capability or incorrect reception quality parameters; and
    track one or more context information associated with the first interface while switched to the second interface.

2. The apparatus of claim 1, wherein the at least one computer program is further configured to, when executed:
    switch the at least first processor back to the first interface of the one or more wireless interfaces; and
    augment at least one radio measurement with the tracked one or more context information.

3. The apparatus of claim 2, where the first interface comprises a data-only network.

4. The apparatus of claim 3, where the one or more context information comprises a duration of switched operation.

5. The apparatus of claim 4, where the at least one radio measurement is adjusted based on the duration, and the first interface comprises a Long Term Evolution (LTE) compliant radio transceiver.

6. A method for modifying one or more measurements based on intermittent operation, comprising:
    by a user equipment (UE) apparatus:
        providing to a first network at least one of incorrect transmission capability or incorrect reception quality parameters selected to discourage assignment of network resources to the UE apparatus;
        switching away from a first network for a duration, wherein the switching occurs after the providing the at least one of incorrect transmission capability or incorrect reception quality parameters;
        tracking one or more context information associated with the first network for the duration;
        resuming operation to the first network;
        adjusting at least one measurement according to the one or more context information; and
        reporting the adjusted at least one measurement to the first network.

7. The method of claim 6, further comprising tuning to a second network during the duration.

8. The method of claim 7, where the first network is a data-only network.

9. The method of claim 8, where the switching away is based on a user-initiated voice call.

10. The method of claim 8, where the switching away is based on a paging schedule of the second network.

11. A method for modifying network management for hybrid operation on at least a first network and a second network, comprising:
    by an apparatus:
        providing to the first network at least one of incorrect transmission capability or incorrect reception quality parameters selected to discourage assignment of network resources to the apparatus;
        suspending one or more first operations associated with the first network, after the providing the at least one of incorrect transmission capability or incorrect reception quality parameters;
        maintaining one or more context information associated with the first network during the suspension; and
        modifying one or more network management parameters based at least in part on the maintained one or more context information.

12. The method of claim 11, further comprising during the suspension of the first network, enabling one or more second operations associated with a second network.

13. The method of claim 12, further comprising responsive to a timer expiration, resuming one or more first operations with the first network and disabling one or more second operations associated with the second network.

14. The method of claim 11, further comprising augmenting one or more context information of the first network with at least one or more updated context information tracked during the suspension.

15. The method of claim 11, wherein the one or more context information comprises cell selection data.

16. The method of claim 11, wherein the one or more context information comprises system information block (SIB) information.

17. The method of claim 11, wherein the one or more context information comprises a history of radio link monitoring information.

18. The method of claim 11, wherein the one or more context information comprises a number of discontinuous reception (DRX) attempts.

19. The method of claim 11, where the first network is a data-only network.

20. The method of claim 19, where the first network is a Long Term Evolution (LTE) network.

* * * * *